Figure 1:
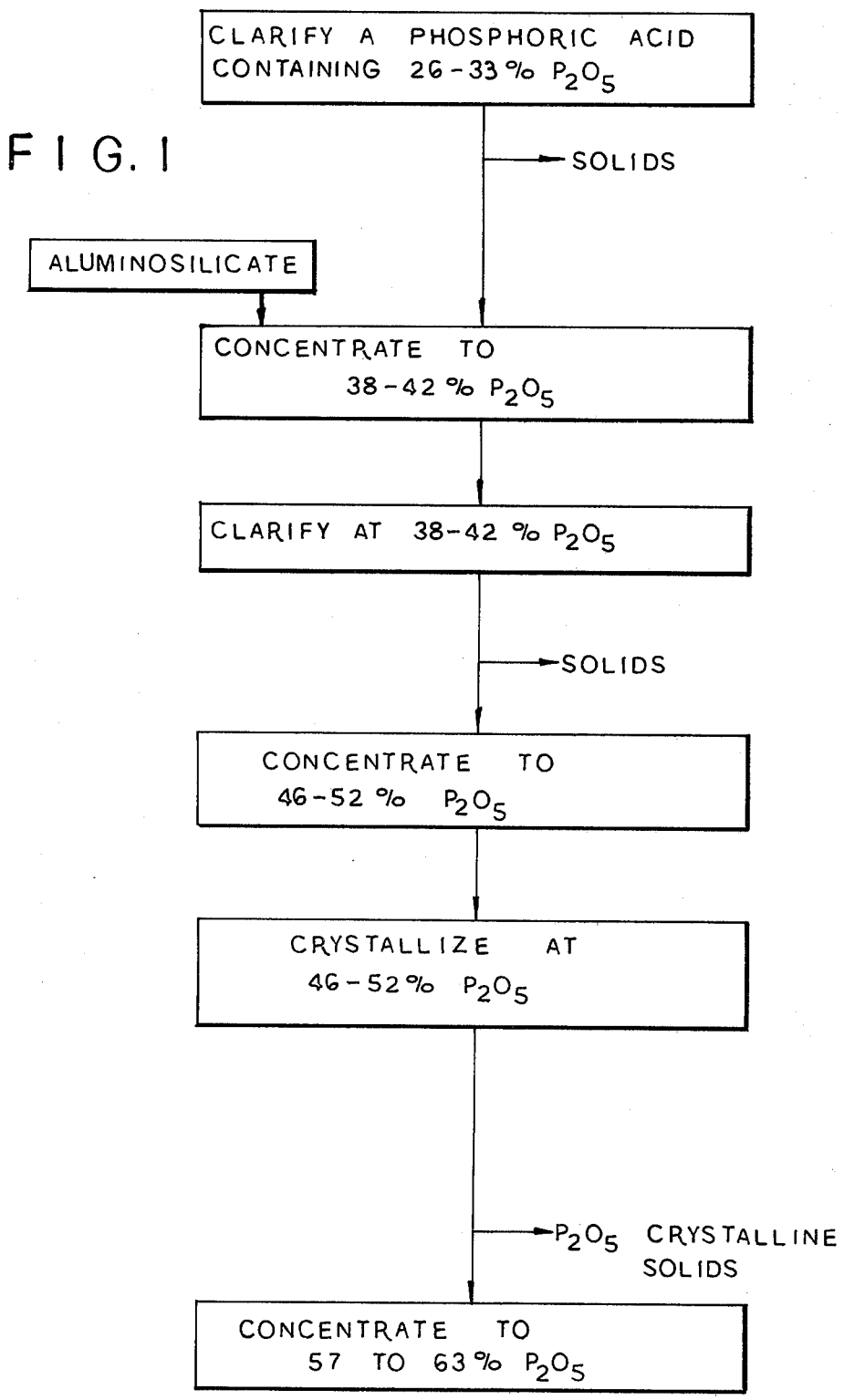

United States Patent [19]

Morrell et al.

[11] 4,442,081

[45] Apr. 10, 1984

[54] PROCESS FOR PRODUCING A STABILIZED PHOSPHORIC ACID

[75] Inventors: Roberto I. Morrell; Charles F. Peters, both of Lakeland, Fla.

[73] Assignee: W. R. Grace & Co., New York, N.Y.

[21] Appl. No.: 446,257

[22] Filed: Dec. 2, 1982

[51] Int. Cl.³ .................... C01B 25/16; C01B 15/16; C01B 25/26; C05B 11/00
[52] U.S. Cl. ................................ 423/321 R; 423/308; 423/310; 423/317; 71/33; 71/43
[58] Field of Search .............. 423/319, 320, 321 R, 423/317, 308, 310; 71/33, 43

[56] References Cited

U.S. PATENT DOCUMENTS

| | | |
|---|---|---|
| 3,907,680 | 9/1975 Hill | 423/321 R |
| 4,110,422 | 8/1978 Hill | 423/321 R |
| 4,364,912 | 12/1982 Hill | 423/321 R |

*Primary Examiner*—Gregory A. Heller
*Attorney, Agent, or Firm*—M. J. McGreal; P. M. Pippenger

[57] ABSTRACT

A wet process phosphoric acid which has been treated with aluminosilicate after the first stage of clarification can be further stabilized against precipitation of solids during storage and transport and the solids from the crystallizer more economically used to make diammonium and triple superphosphate fertilizers by introducing a second stage of clarification of the acid at a $P_2O_5$ concentration of 38 to 42 weight percent.

5 Claims, 2 Drawing Figures

PROCESS FOR PRODUCING A STABILIZED PHOSPHORIC ACID

This invention relates to an improved process for producing a stabilized phosphoric acid. More particularly, it relates to a process where the precipitation of solids during storage or transport is decreased.

A conventional method for the production of wet process phosphoric acid, finely ground phosphate rock is reacted with dilute phosphoric acid (10% $P_2O_5$ to 25% $P_2O_5$) and sulphuric acid which may or may not be diluted. The phosphate rock is leached (i.e., digested or reacted with the acid) to yield a crude aqueous phosphoric acid solution in which is suspended a substantial quantity of solid impurities. This solution is filtered to separate out most of the undissolved gypsum and other solid impurities to yield a crude (26% $P_2O_5$ to 33% $P_2O_5$) aqueous product also known as the No. 1 filtrate. This filtrate still contains suspended, finely divided, impurities that were not removed during the solid liquid separation step plus solids that have crystallized after filtration. The solution also contains dissolved impurities.

The problems occasioned by suspended and dissolved impurities are particularly acute with respect to wet process phosphoric acid. Variable quantities of impurities in the phosphate rock such as organics, calcium, potassium, sodium, aluminum, iron, strontium, titanium, silicon, uranium, vanadium, fluorine, magnesium, etc., are put into solution during the reaction of the phosphate rock with a sulphuric and/or phosphoric acid. Standing, cooling, or concentration of the phosphoric acid solution results in additional solids being formed and precipitated to form a sludge consisting mainly of complexed iron, aluminum, potassium, sodium, calcium, etc., and phosphates, fluorides, silicates, sulphates, etc. This is known in the art as post-precipitation.

Concentrated wet process phosphoric acid, upon standing or during shipment in tank cars or the like, deposits a layer of solid matter forming sludge as above described, which renders handling stored or shipped acid exceedingly difficult and frequently economically unfeasible. Some solids may be removed from the crude solution by conventional filtration or centrifugation. With respect to conventional filtration, however, the concentrated acid is very viscous and difficult to filter. Further, the solids are of such nature that they readily block the filter cloth and the solids are difficult to remove from the filter. With respect to conventional centrifugation, many of the finely divided solids will not be removed, particularly the organic particles, which are lighter and are not removed with the larger heavier inorganic solids from the solution.

The problems of post-precipitation of solids from phosphoric acid have been significantly decreased through use of the so-called Hill process. This process consists of concentrating a wet process phosphoric acid to 26 to 33% $P_2O_5$ and clarifying the acid at this concentration to remove sulfates, silicates and fluosilicates. After clarification, an aluminosilicate is added in a concentration of about 0.05 to 2 weight percent based on the $P_2O_5$ content. The acid is then concentrated to 46 to 52 weight percent $P_2O_5$ and treated in a crystallizer settler to remove phosphate solids. These solids are then mixed with additional phosphoric acid and used for making diammonium phosphate and triple superphosphate products. The liquid phosphoric acid as settler overflow is then usually concentrated to 57 to 63 weight percent $P_2O_5$ and stored or shipped to the customer. In the present invention, additional solids are removed after the addition of aluminosilicate and before crystallization through a second stage of clarification. This clarification stage removes additional amounts of sulfates, silicates and fluosilicates.

In brief summary, the present invention consists in an improvement in the Hill process for making wet phosphoric acid. The improvement consists in concentrating the phosphoric acid to 38 to 42 weight percent $P_2O_5$ after the first stage clarification and addition of aluminosilicate, and again clarifying the phosphoric acid, but this time with the aluminosilicate present. This clarification provides an opportunity to remove amounts of sulfates, silicates and fluosilicates which have remained in the acid due to the constitution of the particular acid or due to processing variations in the first stage of clarification. That is, the make-up of the No. 1 filtrate which is the feed to the first clarifier will depend on the source ore. Different ores will produce a No. 1 filtrates having different clarification characteristics. Also in operating a clarifier, there are day-to-day processing variations. A second stage clarification provides a level of processing insurance.

Also without this second stage of clarification, these solids would come out during crystallization with the result that the $P_2O_5$ content of the crystallizer-settler solids would be decreased. In most cases the crystallizer-settler solids could not be used to make diammonium and triple superphosphate products without adding some of the phosphoric acid product. This use of the purified phosphoric acid product is detrimental to the economics of the process. That is, more final product would have to be used to bring a byproduct up to specification.

The drawings set forth the present improved process for producing a wet process phosphoric acid.

FIG. 1 sets forth in a block diagram the present improved process for producing a phosphoric acid which has increased stability against solids precipitation during storage and transport.

Figure 2:
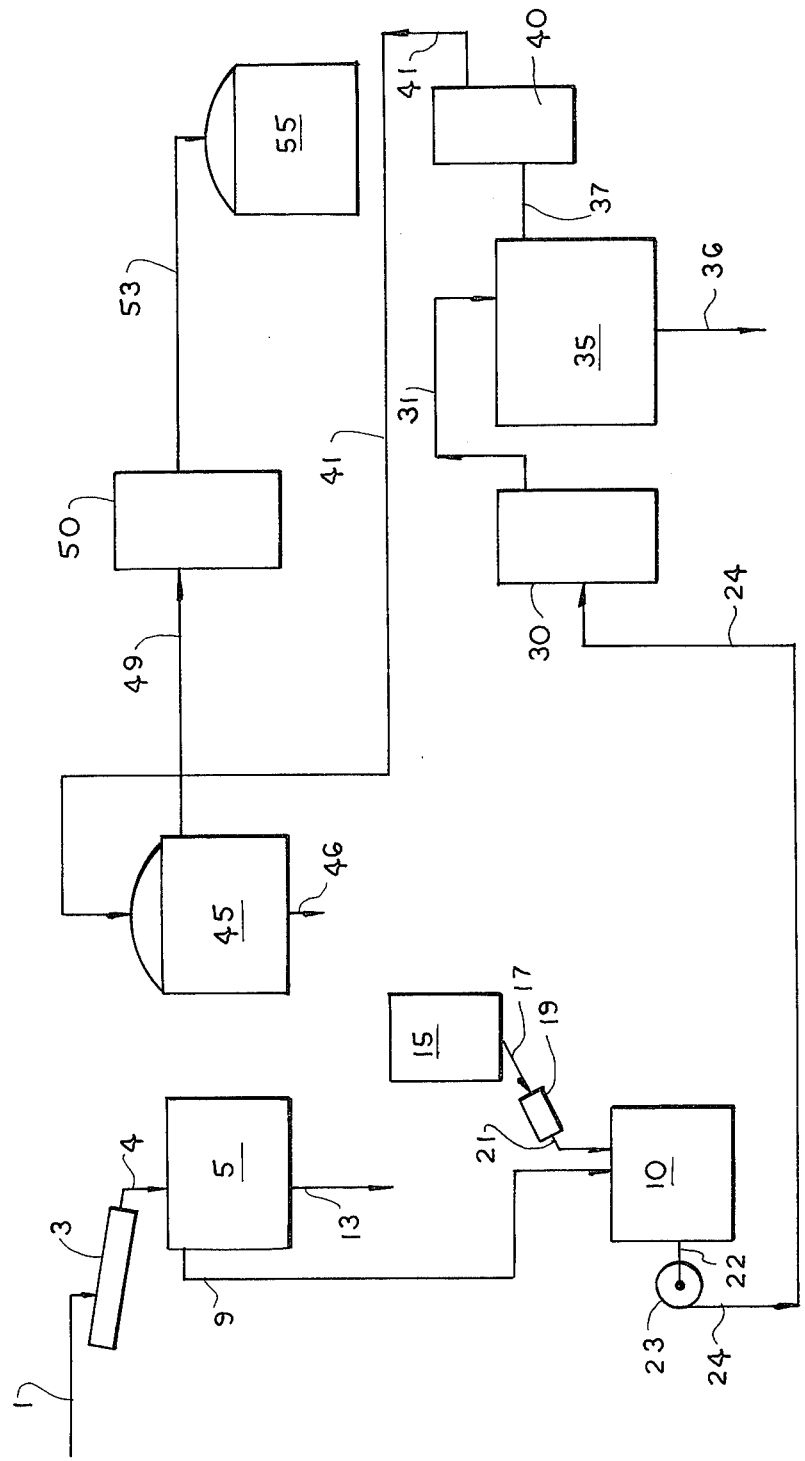

FIG. 2 is a simplified flowsheet for a plant following the process set forth in FIG. 1.

FIG. 1 sets out in block diagram form the steps of the present process from the No. 1 filtrate to the 57 to 63% $P_2O_5$ concentrated acid. The first step in processing the No. 1 filtrate is clarification. The preceding steps are conventional in the wet process phosphoric acid art and are omitted from FIGS. 1 and 2. They include, for example, reaction of phosphate rock with sulfuric acid to produce a crude phosphoric acid containing gypsum. This is filtered with the filtrate being the No. 1 filtrate.

Clarification consists of adding a flocculant such as an polyacrylamide. A suitable flocculant is available under the name Polyhall M295. Numerous other flocculants are available for clarification. Examples include water soluble high molecular weight synthetic polymers, guar, etc. A clarifier consists of a mixing region usually termed the mixing launder, a stilling well and a settling chamber. In the mixing region, the flocculant and phosphoric acid are thoroughly mixed. In the stilling well and settling chamber, the solids settle out of the acid, and are removed as an underflow from the bottom of the settling chamber. The solids go to the gypsum filter, are washed to remove phosphoric acid, and then sent to disposal. The clarified acid is removed from the upper part of the settling chamber as an overflow and an aluminosilicate added in a concentration of about 0.05 to 2.0 weight percent based on the $P_2O_5$ content of the phosphoric acid. This aluminosilicate dissolves in the phosphoric acid and functions to stabilize the acid against solids precipitation when concentrated to above about 50 weight percent $P_2O_5$. The phosphoric acid is agitated to insure that the aluminosilicate is fully dissolved.

The preferred aluminosilicate is perlite, and preferably perlite in the expanded form. However, other aluminosilicates such as vermiculite and both synthetic and naturally occurring zeolites can be used. The advantages in adding aluminosilicates to phosphoric acid in order to stabilize the phosphoric acid is set forth in U.S. Pat. Nos. 4,110,422 and 4,164,550. The aluminum silicate may be amorphous or crystalline.

After the addition and dissolution of the aluminosilicate, the phosphoric acid is concentrated in conventional evaporation equipment to about 38 to 42 weight percent $P_2O_5$ and preferably about 40 weight percent, and the phosphoric acid is again clarified. The equipment and clarification technique are the same as the first stage clarification at 26 to 33 weight percent $P_2O_5$. That is, a flocculant is added to the acid and the acid flowed into the clarifier. A clarified acid is taken off the upper part of the clarifier with solids removed as an underflow. The solids again consist primarily of sulfates, silicates and fluosilicates. That is, the solids are similar to those removed in the first stage of clarification. These solids are sent to the gypsum filter for removal of phosphoric acid. After this stage of clarification, the acid is concentrated to a $P_2O_5$ content of 46 to 52 weight percent, and preferably about 48 to 50 weight percent. This concentrated acid is then flowed to a crystallizer. In the crystallizer, primarily phosphate containing solids precipitate. These solids are removed at the bottom of the crystallizer and are conveyed for use in making solid fertilizers. The purified acid is then ready for use, or can be concentrated to 57 or 63 weight percent $P_2O_5$ and used. When the acid is to be transported via rail or truck for use at a remote site, it is preferred to concentrate the acid to 57 to 63 weight percent $P_2O_5$.

FIG. 2 sets out a flowsheet for a plant which would use the foregoing process. The incoming dilute feed acid enters the system via line 1. This acid is suitably the so-called No. 1 filtrate from the wet process phosphoric acid reaction system. The No. 1 filtrate is well-known to those skilled in the art and it contains typically phosphoric acid analyzing about 28% as $P_2O_5$. The No. 1 filtrate is fed to launder 3, whence it exits via line 4 to clarifier 5. Clarifier 5 overflows via line 9 to perlite mix tank 10. The clarifier underflow exits via line 13 and is preferably returned to the reaction train, e.g., to the headbox of the gypsum filter not shown. At 15 is shown the perlite storage container. This feeds via line 17 into perlite feeder 19 which exits via line 21 to mix tank 10. Exit line 22 leads from mix tank 10 through pump 23, thence via line 24 to evaporator 30. The concentrated product exiting from evaporator 30 exits via line 31. Line 31 feeds into clarifier 35. Clarified acid overflows the clarifier and flows through line 37 to evaporator 40. The under flow solids from the clarifier exit at 36 and are conveyed to the gypsum filter for washing. The concentrated acid flows from the evaporator through line 41 to crystallizer 45. The underflow from crystallizer 45 exits via 46 and is conveyed to make diammonium and triple superphosphate solid fertilizers. The crystallizer overflow proceeds via line 49 to evaporator 50. Here the phosphoric acid is further concentrated, e.g., from about 50% up to about 60%. The final product exits via line 53 and is collected in product storage tank 55.

EXAMPLE 1

This example illustrates the advantages of the process of the flowsheet of FIG. 2. During the first six months of 1982, a W. R. Grace & Co. plant at Bartow, Florida was run at different periods with clarifier 35 in and out of the line. However, since the phosphate rock analysis varied and processing to produce the No. 1 filtrate could not be held constant over this period of time, the results cannot be considered to be quantitatively exact. Regardless, the data did show on a qualitative basis and a semi-quantitative basis that there are definite advantages to having two stages of clarification, with one at 38 to 42 weight percent $P_2O_5$. The data in the following Table 1 is based on typical results which can be expected in operating a phosphoric acid plant once steady state conditions have been established. Crystallizer overflow is stream 49 from crystallizer 45. Crystallizer underflow is the slurry material removed at 46. All values are in weight percent.

| Substances In Weight Percent | Typical Operating Plant Data | | |
|---|---|---|---|
| | Crystallizer Overflow | Crystallizer Underflow | |
| | | No 2nd Stage Clarification | With 2nd Stage Clarification |
| Solids | 0.5 | 15.6 | 14.8 |
| $P_2O_5$ | 50.6 | 44.2 | 48.2 |
| $C_aO$ | 0.42 | 5.83 | 5.36 |
| $SO_4$ (as $H_2SO_4$) | 4.2 | 9.1 | 8.6 |
| F | 0.81 | 3.56 | 1.63 |
| $SiO_2$ | 0.41 | 1.88 | 0.81 |
| $P_2O_5$ Distribution | 90–97 | 5–10 | 3–8 |

The crystallizer overflow which is the marketable acid is little affected through the use of one or two stages of clarification. The reason is that the crystallizer will function to remove solids which a single stage of clarification would fail to remove. However, there is a considerable affect on the byproduct phosphate solids which leave the process as the crystallizer underflow. That is, the second stage of clarification removes quantities of calcium sulfate and fluosilicates to raise the $P_2O_5$ content of the underflow by about 4 weight percent. This enables the direct use of the crystallizer underflow to make diammonium phosphate and triple superphosphate byproducts with the addition of a decreased amount of product acid.

I claim:

1. A method for preparing wet process phosphoric acid having a $P_2O_5$ content of about 57 to 63 weight percent comprising:
   (a) clarifying crude feed phosphoric acid in a clarifier, said phosphoric acid having a $P_2O_5$ content of about 26–36% $P_2O_5$;
   (b) separating the clarified phosphoric acid portion from the settled solids;
   (c) dissolving about 0.05 to 2.0 weight percent of an aluminum silicate material based on the total weight of $P_2O_5$ to the clarified phosphoric acid;
   (d) concentrating the phosphoric acid to a $P_2O_5$ content of 38 to 42 weight percent;
   (e) clarifying the concentrated phosphoric acid in a clarifier thereby causing solids to settle by gravity in the clarifier and separating a further clarified phosphoric acid from the settled solids;
(f) concentrating the separated phosphoric acid to a $P_2O_5$ content of about 46 to 52 weight percent;
(g) crystallizing phosphate-containing solids and separating such solids from said phosphoric acid;
(h) concentrating the remaining phosphoric acid to a $P_2O_5$ content of 57 to 63 weight percent; and
(i) utilizing the solids from step (g) to prepare one or more by-products selected from the group consisting of diammonium phosphate and triple superphosphate.

2. A method as in claim 1, wherein the separated solids from each stage of clarification are returned to the gypsum filter and washed to remove any retained $P_2O_5$ values.

3. A method as in claim 1, wherein said aluminum silicate is amorphous.

4. A method as in claim 1, wherein said aluminum silicate is selected from the group consisting of perlite, vermiculite, and zeolite.

5. A method as in claim 1, wherein said aluminum silicate is crystalline.

* * * * *